United States Patent [19]

Schneiderhan et al.

[11] 4,454,583
[45] Jun. 12, 1984

[54] NAVIGATION SYSTEM

[75] Inventors: Edward M. Schneiderhan, Glenview; Micheal V. Pathe, Waukegan; Kurt R. Schaffert, Northbrook, all of Ill.

[73] Assignee: Signal Scanning Products, Inc., Northbrook, Ill.

[21] Appl. No.: 279,208

[22] Filed: Jun. 30, 1981

[51] Int. Cl.³ .......................... G01S 5/04; G06F 15/50
[52] U.S. Cl. ..................................... 364/449; 343/432
[58] Field of Search .............. 364/449, 559, 446, 424; 343/113 R, 115, 124, 117 A, 120, 112 C; 340/168 B, 171 R

[56] References Cited

U.S. PATENT DOCUMENTS

| | | | |
|---|---|---|---|
| 2,569,328 | 9/1951 | Omberg | 346/33 |
| 3,304,551 | 2/1967 | Oki et al. | 343/112 |
| 3,419,868 | 12/1968 | Clayton, Jr. | 343/113 |
| 3,515,342 | 6/1970 | Brunk | 235/150.27 |
| 3,681,707 | 8/1972 | Bean | 331/64 |
| 3,727,226 | 4/1973 | Bush | 343/112 PT |
| 3,886,553 | 5/1975 | Bates | 364/449 X |
| 4,057,803 | 11/1977 | Coleman | 343/113 R |
| 4,071,845 | 1/1978 | Gross | 343/113 R |
| 4,086,632 | 4/1978 | Lions | 343/112 C X |
| 4,163,978 | 8/1979 | Shepherd et al. | 343/120 |
| 4,234,924 | 4/1978 | Vance et al. | 364/449 X |
| 4,368,470 | 1/1983 | Mori et al. | 343/115 X |

FOREIGN PATENT DOCUMENTS

| | | |
|---|---|---|
| 882469 | 11/1961 | United Kingdom . |
| 909221 | 10/1962 | United Kingdom . |
| 2047039 | 11/1980 | United Kingdom . |

OTHER PUBLICATIONS

Landfall A High-Resolution Automatic Vehicle-Location System; D. King, GEC Journal of Science & Technology, vol. 45, No. 1, 1978, pp. 34-44.

Primary Examiner—Edward J. Wise
Attorney, Agent, or Firm—Jay G. Taylor

[57] ABSTRACT

Disclosed is a navigational system for accurately determining the position of a vehicle, such as a boat, truck, automobile or airplane in relation to two or more commercial AM radio transmission antenna or other signal sources of known longitude and latitude. The frequencies and exact coordinates (longitude and latitude) of the radio antenna are entered by keyboard input into the memory of the system. The null angles from the vehicle to the radio antenna are determined automatically by a computer controlled radio direction finder antenna mounted on the vehicle. The heading of the vehicle is determined and the relative null angles (in relation to the heading of the vehicle) are converted to standard null headings (North, 0°) by the system. The known positions of the stations are automatically compared by the system to the respective true and false (180° opposite) null headings and the correct angles are selected according to the proper trigonometric relationship (the sum of the internal angles of a triangle must equal 180°). Once the system has selected the proper null headings, the exact position of the vehicle can then be determined automatically and the coordinates displayed on a visual display. The system can also be adapted to allow input of one or more sets of destinational or navigational coordinates and the system will display the correct compass heading to be steered to reach the selected coordinates. The coordinates of hazards can also be entered and the system will provide a warning if the vehicle comes too close to the hazards.

22 Claims, 3 Drawing Figures

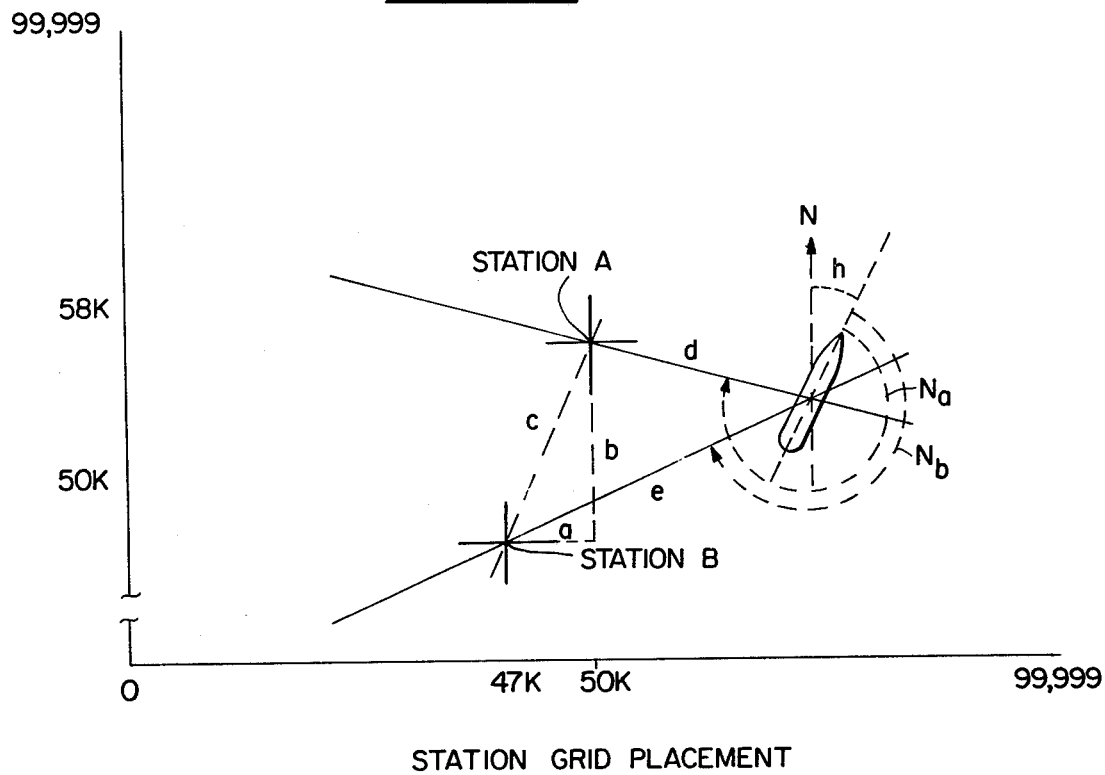
STATION GRID PLACEMENT

NAVIGATION SYSTEM

BACKGROUND OF THE INVENTION

1. Field of the Invention

The present invention pertains to navigational systems for determining the location of a moving vehicle such as a boat, truck, automobile or airplane. More particularly, the present invention relates to an automatic system for determining the location of a vehicle in relation to two or more known commercial AM or FM radio transmission antenna or any other radio signal source of known location and frequency.

2. Description of the Prior Art

Various types of equipment and systems for assisting in navigation and determining the location of a vehicle such as a boat, truck, automobile or airplane are known to the art. In the area of maritime navigation, the best known and most extensively used commercial system is known as Loran-C. Loran-C is an improved version of Loran-A which was developed during World War II. A Loran-C receiver measures the difference in time of arrival of two different specially transmitted radio signals, one from a master Loran-C transmitting station, the other from a secondary Loran-C transmitting station. Because the Loran-C signals travel at a known speed (the speed of light), a time-difference reading allows the navigator to plot a position as a line of position on a chart. To get an accurate fix of position, yet another reading must be taken from a third Loran-C station to find the intersection of the two time differential lines. While Loran-C is a significant improvement over the Loran-A system, which had numerous deficiencies, Loran-C still is not extremely accurate and has limited utility close to shore or close to the source of the signals. Further, Loran-C is dependent upon special transmitting stations and cannot be used except in the proximity of such stations.

Similarly, aircraft navigational systems are dependent upon special beacon radio stations that transmit at special frequencies. One such system is illustrated in U.S. Pat. No. 2,569,328-Omberg. Neither Loran-C or the aviation system is adaptable for multiple use by different types of vehicles. Loran-C is limited to marine use and the aviation systems are limited to use in airplane navigation.

Also, with the advance of space technology, satellite navigation systems such as that disclosed in U.S. Pat. No. 3,304,551-Kikuo Oki et al. are being used more frequently. However, such systems are extremely expensive to set up and presently are used to determine locations of very large ships at sea periodically as the navigational satellite passes overhead.

For smaller marine vessels, for example, manual techniques have been utilized for years to find the position of a vessel. Directional sensitive antenna are well known and have been used for years to determine the null angle to known radio stations. With at least two null angles and a chart having a location of the radio antenna plotted, the position of the vessel can be roughly determined by triangulation on a chart. However, such manual techniques are time consuming, inaccurate and usually difficult if not impossible to perform when the vessel is rolling or tossing in heavy waves. Unfortunately, it is during such times of possible distress that accurate positional information is most important for the safety of the vessel and its passengers.

Further, there is no known system for quickly and accurately determining the location of a truck or automobile. While such information is of limited value to most motorists, a system that can monitor and record vehicle travel would be very beneficial to many businesses that depend upon economical truck delivery. A system that could accurately determine and record the periodic location of delivery trucks would be useful in eliminating excess costs resulting from poor performance of lazy drivers.

Thus, it would be a substantial advance in the art to have a small compact inexpensive system which may be utilized in small vehicles such as pleasure boats, motor vehicles, or private airplanes which could automatically and very accurately determine the exact location in respect to two or more commercial AM radio transmitting antenna. Such commercial radio transmitting antenna may be found throughout the world. Thus, no special transmission equipment or antenna need be installed and the system can be used anywhere that there are commercial radio stations.

BRIEF SUMMARY OF THE INVENTION

A navigational system in accordance with the present invention for determining the position of a vehicle, such as a boat, truck, automobile, or airplane from the radio transmissions of two or more commercial radio stations of known frequency and location comprises means for entering and storing the frequencies of and longitude and latitude coordinates of the at least two selected AM or FM radio stations or any other source of radio signals of known location and frequency. The system also includes a rotatable directionally sensitive radio antenna and means for rotating the antenna through 360°. Means are provided for providing a reference radio signal representative of the frequency of the selected radio stations and causing the directionally sensitive antenna to rotate until the position of the antenna is in a null relation to the radio station. Also, means for detecting the heading of the vessel and generating heading signals representative of the heading is incorporated in the system. Means are also provided for converting the null angle to a compass heading based upon heading signals. Since null headings include both a true heading and a false heading (180° opposite) means are also provided for determining the real null heading for each of the radio signal sources. This is accomplished automatically by application of trigonometric principles. Additionally, means for converting the point of intersection of the real null headings into the corresponding values of longitude and latitude of the vehicle are provided and means for visually displaying the longitude and latitude values for the position of the vehicle are provided.

The system may also include means for entering one or more desired destinational coordinates or navigational way points and means for determining the heading to be steered to arrive at those preselected points. Alternatively, the coordinates of hazards such as rocks, shoals, or submerged wrecks can be entered and an audible warning given by the system if the vessel comes too close to such hazards. Also, the system clock permits the speed to be determined and the estimated time of arrival to a desired destination to be determined by the system and display visually when requested.

The system may also be equipped with additional peripheral devices such as an automatic pilot, plotter, etc. that will augment the application of the system. Further, the present system can be equipped with a recorder that will record the positional data generated by the system for subsequent monitoring purposes. For example, the present system could be adapted to be incorporated in vehicles such as delivery trucks for the purposes of subsequent monitoring to determine whether the drive has followed the proper delivery route and has made the scheduled deliveries in an efficient manner.

Further, the system allows the entry of a true heading of the vehicle in relation to a known reference such as a sea wall, pier, street, etc. A corresponding magnetic compass heading may be entered. As the vehicle is rotated, additional compass headings may be entered and the system will effectively construct a table of true headings and corresponding compass readings that compensates for variations in magnetic field and other inherent compass errors. Thus, true headings can be continuously determined as the null angle to the signal source changes. Consequently, the system allows accurate navigation even in areas of variation in the earth's magnetic field.

The present system, while principally designed for marine use, is easily adaptable for inclusion in an airplane, automobile, truck, or any other vehicle that travels in proximity to commercial AM radio stations.

Thus, it is a principal object of the present invention to provide an accurate high-speed navigational system that can quickly and accurately determine the exact location based upon signals received from commercial AM radio stations.

It is a further object of the present invention to provide a navigational system that minimizes the amount of human intervention required to determine location.

It is yet a further object of the present invention to provide a navigational system which allows for the input and storage of the coordinates of one or more way-points or destinational points with the system providing a visual display of the heading to be steered to reach those desired points.

Yet another object of the present invention is to provide a navigational system which is capable of determining the speed and calculating the estimated arrival time on a continuous basis.

A further object of the present invention is to provide a navigational system that allows entry of the coordinates of hazards and the system automatically provides a warning when those hazards are approached.

These and other objects, advantages and features shall hereinafter appear, and for the purposes of illustration, but not for limitation, an exemplary embodiment of the present invention is illustrated in the accompanying drawings and described in the following detailed description of the preferred embodiment.

DESCRIPTION OF THE DRAWINGS

FIG. 3 is a graphic illustration of possible angular relationships between the radio antenna and the vessel.

DETAILED DESCRIPTION OF THE PREFERRED EMBODIMENT

Figure 1:
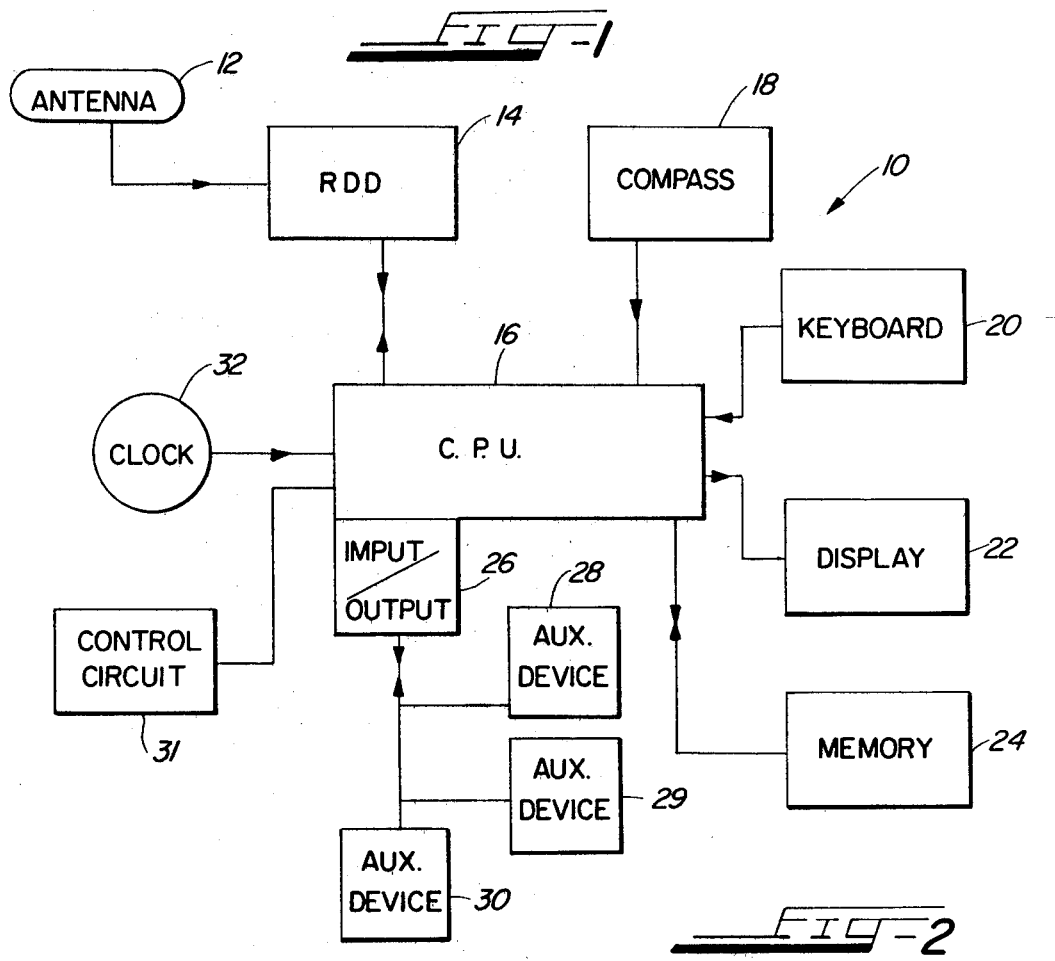
FIG. 1 is a block diagram of the various components of a preferred embodiment of the present invention.

With reference to FIG. 1, navigational system 10 for use in vehicles such as boats, automobiles, trucks and airplanes comprises a direction sensitive radio antenna 12 connected to a radio detection device (RDD) 14.

The radio detective device 14 is connected to a central processing unit (CPU) 16 which performs the function of processing and manipulating the data received from the various elements of the system. CPU 16 is a microprocessor commercially available from a variety of manufacturers. Also connected to the central processing unit is a compass 18 having electronic sensors for providing signals representative of the magnetic heading registered by the compass. A keyboard 20 permits data and instructions to be entered into the system such as the coordinates and frequency of the preselected radio stations or the function to be performed by the system, e.g., estimated time of arrival. A visual display 22 is also connected to the central processing unit for displaying various data either entered into or processed out of the system. A memory 24 is provided for storing various data necessary for the operation of the system such as the coordinates and the frequencies of the preselected radio stations. Memory 24 is also a commercially available chip that allows large storage capacity in a very small package.

An input/output port 26 is connected to the central processing unit for providing input/output interface between various auxiliary devices 28, 29 and 30. Auxiliary devices 28, 29 and 30 could comprise, for example, a plotter unit for visually indicating location on a navigational chart, an automatic pilot control, a wind direction sensor for sail boats, a tachometer for determining engine rpm, a hazard or collision warning device, a data recorder for recording precise locations on a time basis, or a number of other similar devices that could be used in conjunction with the system 10.

A control circuit 31 is connected to the CPU 16 and controls the operation of the system in accordance with the selection of the desired operation by actuation of an appropriate key on keyboard 20 as will be more fully described below. Control circuit may either be a programmable read only memory (PROM) or a read only memory (ROM) specifically designed to control the operation of the system. Additionally provided is a clock 32 for providing high-reliable time information needed for speed and distance calculations.

Figure 2:
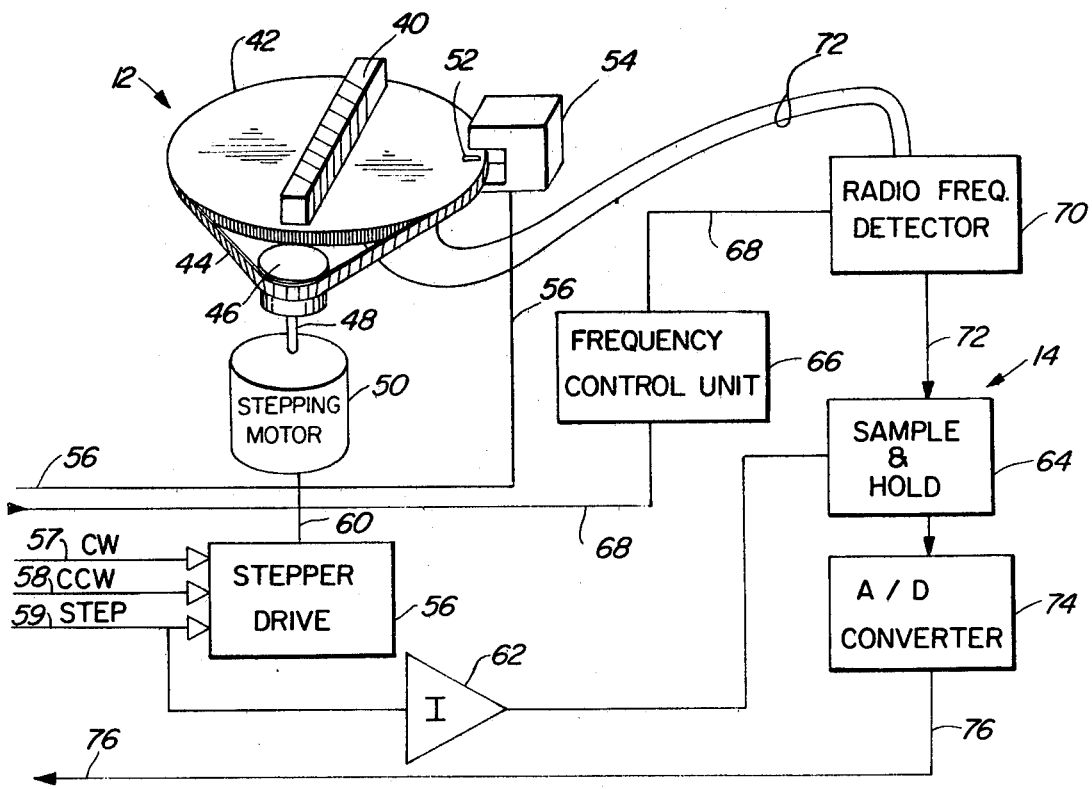
FIG. 2 is a block diagram of the antenna and radio direction finder portion of the present invention.

With more particular reference to FIG. 2, the antenna 12 and radio detection device 14 is illustrated in more detail. Directional sensitive antenna 12 comprises a receiving antenna coil 40 mounted on a rotating pulley plate 42 over which a belt 44 is stretched to a pulley 46 mounted to the shaft 48 of a stepping motor 50. When the central axis of coil 40 is pointed directly toward a source of radio signals, the maximum signal is received. The minimum signal is received when the axis of coil 40 is perpendicular to the source of the signals. The relationship between the diameter of pulley 46 and plate 42 is such that one step of stepping motor 50 produces an angular step of 0.25° for the axis of antenna coil 40. A reference hole 52 is formed in the periphery of plate 42 which is used as a zero reference position. A sensor element 54 detects the reference hole and sends a reference signal to the central processing unit 16 via conductor 56.

The stepping motor 50 is controlled by a stepping drive circuit 56 which receives signals from the central processing unit 16 on conductors 57, 58 and 59. Circuit 56 converts those signals into the correct impulses on conductors 60 to cause the stepping motor to step in the appropriate direction. Stepper drive circuit 56 also includes a counter which counts the number of sample periods (200 per step) as will be more fully explained below. Lines 57 and 58 determine the direction of the stepping motor with a signal on line 57 causing the stepping motor to step in a clockwise direction and a signal on line 58 causing the stepping motor to step in a counterclockwise direction. Each signal pulse on line 59 causes the stepping motor to step one step.

A step command signal on line 59 also is applied to an inverter 62 which in turn applies the inverted signal to a sample and hold circuit 64. Sample and hold circuit 64 is gated "off" when there is a step command and gated "on" when there is no step command. The stepping motor may produce unwanted noise when operating producing an unwanted erroneous signal to the system. The gating of the sample and hold circuit 64 assures that unwanted noise is not present during actual null detection or processing eliminating the possibility that electrical noise generated by the stepping motor might interfere with radio signal detection.

A frequency control unit 66 receives from the central processing unit on conductor 68 a digital signal indicative of the frequency of a preselected radio signal source previously entered into the system which is to be detected by antenna 12. Frequency control unit 66 produces an analogue equivalent of the digital signal corresponding to the frequency of the signal source to be detected, eliminates analogue frequency drift, and applies that analogue signal on line 68 to radio frequency detector 70. Radio frequency detector 70 contains an oscillator whose frequency is a function of the analogue input from frequency control unit 66. Detector 70 detects from the input on lines 72 connected to antenna coil 40 the received signal corresponding to the frequency of the oscillator. The output on conductor 72 represents the amplitude of the detected signal to the exclusion of other radio signals at other frequencies.

Conductor 72 is connected to sample and hold circuit 64 which applies it to an analogue to digital converter 70. The amplitude of the signal is converted by converter 70 to a digital value representative of the rf amplitude of the detected signal received by antenna 12. This digital value is conducted by conductor 76 back to the central processing unit 16.

For more thorough understanding of the operation of the system, assume startup of the system by the operation of an appropriate command key on keyboard 20. Upon receipt of a startup signal, the central processing unit under the control of control circuit 31 causes the stepping motor 50 to start stepping until sensor 54 detects the reference hole 52 in plate 42. The central processing unit then stops the stepping motor in the initial or zero reference position and clears the counter in the stepper drive unit. The operator enters the frequency data and positional coordinates of at least two commercial radio station antenna or other signal sources which are sufficiently close to the unit to allow radio signals to be detected by the antenna 12. This information is stored in memory 24 for further use. Once the appropriate station data has been entered, the central processing unit commences radio frequency detection for the first station.

The central processing unit 16 directs the frequency control unit 66 to generate the analogue frequency corresponding to the frequency of the first selected radio signal source. The central processing unit then directs the stepper drive to commence stepping the antenna 12. As the antenna commences stepping the central processing unit causes the system to start sampling the radio signals. The system samples the signal two hundred (200) times per step as antenna 12 rotates for greater resolution of the null point and improved accuracy and repeatability.

If the first digital amplitude reading is less than the second digital amplitude reading, the detected signal is increasing and antenna 12 is being directed away from a null position in relation to the source. Conversely, if the first digital amplitude reading is greater than the second, the signal is decreasing and antenna 12 is being directed towards a null. If sampling indicates the antenna is being stepped away from a null, the central processing unit sends an appropriate signal over either conductor 57 or 58 to reverse the direction of the stepper drive and stepping motor 50. Additional readings are performed, and successive comparisons made, e.g., first to second, second to third, third to fourth, etc. If the successive values indicate that the signal is reduced for each subsequent step, the axis of antenna coil 40 is continuing to be stepped toward the transmitting antenna.

As the stepping motor is being stepped from the zero or reference position indicated by sensor 54, the counter in stepper drive circuit 56 counts the number of step sample periods from the zero reference position to determine the angular position of the axis of antenna coil 40 within 0.25° divided by 200 or 0.00125° resolution. A signal null is detected by antenna 12 when a decreasing signal amplitude sequence becomes an increasing amplitude upon a successive step. This means the axis of the coil 40 has passed the radio signal source. The first step count at which this occurs is a first null detect count which is recorded and stored in memory. The central processing unit 16 under the control of control circuit 31 then directs the antenna to sweep to the left and then to the right of the first null detect count by a set number of counts and a second null detect count is determined. Ten such sweeps are made and the central process unit stores each null point count in memory 24.

The central processing unit then processes the null point counts by subtracting each from the other to generate a series of null delta values. The fifteen null delta values which are the smallest are then summed and averaged by the central processing unit. This technique compensates for error resulting from pitch or roll caused by such factors as sea conditions for a vessel, wind conditions for an aircraft or road conditions for a truck. This technique effectively selects a value for the null which has the highest probability of being the actual or true null angle. The resultant null angle value is stored and the process is repeated for the next selected radio frequency. For increased accuracy, more than two radio signal sources may be detected but it has been determined that more than four signals do not meaningfully increase the accuracy of the system.

The detected value represents the null angle between the heading of the vehicle and the null position of the antenna 12 to the radio station. The compass 18 continuously provides input signals to the central processing unit indicative of the compass heading of the vehicle. Compass 18 is equipped with electronic sensors which provide electronic signal which will reflect any change in direction to an accuracy of one-half of one degree. However, since the readings of compass 18 will be influenced by the pitch, roll and movement of the vehicle, a multiple sample technique is employed to increase the accuracy of the compass readings. For each null count detected, the compass heading value is retained. When 10 null point counts are sensed by the radio detection device, the compass heading for each of the null point counts is retained and the compass headings for those null points are summed and averaged. This technique provides a compass heading to within one-eighth of a degree. The resultant average heading value is stored in memory 24 for future use.

With reference to FIG. 3, North is up the X axis and the vehicle heading is represented by angle "h". The null angle to station A is angle "Na" and the null angle to station B is angle "Nb". Thus, the null headings to each station are Na+h and Nb+h, respectively.

Once the null angles to the radio antenna have been ascertained and stored, the system is ready to commence determining the location of the vehicle. The central processing unit under the control of circuit 31 places the position of each of the radio antenna on an imaginary grid and scales the grid depending upon the distance between the respective radio antenna.

The longitude and latitude of each of the radio antenna is positioned within the grid by the central processing unit 16 on the basis that the antenna having the most easterly longitude (station A) is given the coordinates of 0, 0 on the grid for calculation purposes. Next, the central processing unit determines the position of the second station (station B) by determining the difference in magnitude of the longitudes of the two stations which is represented by the side "a" of the right triangle in FIG. 3. The central processing unit then determines the sign difference in magnitude of the latitudes of the two stations A and B and that value corresponds to side "b" of the right triangle illustrated in FIG. 3. Next, the central processing unit determines the straight line distance between station A and B which corresponds to side "c" of the right triangle illustrated in FIG. 3. This distance is determined in accordance with the trigonometric formula $c^2$ is equal to $a^2+b^2$.

The next function to be performed by the central processing unit 16 is to determine on which side of the base line c between the stations A and B the vehicle is actually positioned. The directional sensitive antenna 12 produces two null angles, a true null angle and a false or anomalous null angle 180° opposite for each radio station. This occurs because antenna 12 cannot distinguish from which side of the axis of the antenna coil the signal is coming. Some prior attempts have been made to solve this problem by using antenna coil windings of different lengths at opposite ends of the antenna to measure the relative difference between the strength of the signals existent at opposite ends of the antenna to attempt to determine the direction from which the signal is coming. However, such sensory antennae have not been particularly adequate, accurate or satisfactory since measurement of such minute differences in signal strength are dependent upon such critical variable factors as component temperature, age, etc. The present system eliminates such problems. Only the correct or true set of null headings will produce a triangle which satisfies the geometric rule that the sum of the interior angles equals 180° whereas the false or anomalous headings will not.

While it is not necessary to do so, to simplify the manipulations, the central processing unit rotates the abc right triangle of stations A and B through an angle of rotation necessary to place the side c on the Y axis. In this position, the vessel, vehicle or airplane is either to the right or to the left of the Y axis meaning that it has an X value that is either positive or negative. In the example of FIG. 3, the angle of rotation is the angle whose sine equals side "a" divided by side "c" plus 90°. If station B had been above station A, the angle of rotation would be the angle whose sine equals side "b" divided by side "c". The central processing unit also adjusts the null headings by the angle of rotation necessary to rotate the side "c" to the Y axis.

Once this is accomplished, the central processing unit can determine whether the vessel is to the right or left of the Y axis very quickly by summing the possible interior angles. Four values for two of the interior angles are known, i.e., the angle between side "c" and the vector to the vehicle from each radio station. The vector headings back from the radio station to the vehicle are 180° opposite the null heading from the vehicle to the station. Two values are false and two values are the correct interior angles. Since the summation of the correct two known interior angles will be less than 180° and the summation of the incorrect interior angles will be greater than 180°, the central processing unit can quickly determine the correct interior angles between line c and the vectors to the vehicle. With these two interior angles known, the third interior angle, i.e., the angle between the respective null headings from the vehicle to the radio antenna may be quickly calculated by subtracting the two interior angles from 180°.

For example, for station A, the possible interior angles for a vector heading are less than 180°, the vector angle; and for a vector greater than 180°, 360° minus the vector angle. Similarly, for station B, the possible interior angles are, for a vector heading less than 180°, 180° minus the vector heading, and for the vector greater than 180°, the vector angle minus 180°. Since the vessel is either between 0° and 180° or between 180° and 360°, i.e., one side or the other of the Y axis, the interior angles are either those angles found for a position less than 180° or those angles found for a position greater than 180°. Since the sum of all interior angles must be less than 180°, the pair of interior angles whose sum is less than 180° will be the correct set of interior angles. The other set of possible angles will have a sum greater than 180°.

One side of the triangle is known, i.e., the distance between the radio antenna A and B (side c). Once all three interior angles are known, the central processing unit can determine the length of the remaining two sides of the triangle in accordance with the equation: d/sine d=e/sine e=c/sine c, where d and e are the lengths of the sides of the triangle representing the distance to the vehicle from the station and the angles on the respective interior angles.

Once the length of the respective sides of the triangle are known, the central processing unit can ascertain the coordinates in relation to the reference station A. Once the grid coordinates are calculated, those grid coordinates can be easily converted to longitude and latitude value based upon the respective longitude and latitude values for the selected radio antenna. This is accomplished by applying a factor of miles per second of longitude or latitude depending upon the scale factor of the grid. This resultant value is displayed to the navigator on the visual display.

Because of the high speed nature of the calculations performed by the central processing unit 16, an accurate fix on the position of the vehicle can be accomplished in a matter of seconds, with the majority of the time involved in rotating the antenna to acquire the null point count information.

The system may also be used not only to determine the exact location of a vehicle at a particular point in time but to also determine the correct heading to be steered for the vehicle to reach a particular destination. For example, in terms of a marine vessel, the coordinates of the longitude and latitude of the entrance of a harbor may be entered into the memory via the keyboard. Since the system is continuously capable of determining the exact position of the vessel in terms of its longitude and latitude, the central processing unit 16 determines at any given moment the correct navigational angle to be steered to reach the desired location. Further, the system will continuously revise and update the heading information to make adjustments for the effects of wind and current upon the movement of the vessel. Further, as may be seen, such information may easily be used to control an auxiliary device such as an automatic pilot control that will maintain the vessel on the correct course automatically without human control. This feature is of great benefit for both use in boats and airplanes.

If desirable, multiple way points or destination points may be preselected and recorded in the memory so, for example, the vessel may be steered around an obstacle or through a narrow winding channel. The system will provide the correct heading to the first way point and then provide an audible signal when that destination point is reached so that the navigator will know to change the heading to the newly-displayed heading. Subsequently, audible signals and new headings will be provided as the vessel reaches each succeeding way point. Similarly, the vessel will be controlled by an automatic pilot under the control of the system. In the same manner, hazardous locations such as rocks or shoals may be recorded and an audible signal given when the vehicle is in the vicinity of the hazard.

Additionally, clock 32 is a very precise chronometer which allows the system to compute the exact speed, distance covered, distance to go and estimated time of arrival based upon the start and destination data entered into the system.

Further, since the system is very flexible, various other auxiliary units may be used to assist the navigator or operator. For example, such information as engine temperature and engine rpm may be fed into the system through one of the auxiliary devices 28-30 and the information displayed on the visual display when called for by actuation of an appropriate selector switch on the keyboard.

The system also permits the entry and storage of accurate or true heading information that will increase the accuracy of the system and permit compass calibration. If the navigator knows the true heading to a known landmark, the navigator aligns the vehicle with the landmark and enters the true heading. The system then can determine the relative angle between the known heading and the heading to a known detected radio station and store that information so that as headings change the true heading angle can thereafter be determined by detecting changes in the null heading to the reference station.

It should be apparent from the foregoing that the system is applicable to any type of moving vehicle and is particularly suited for boats, ships, trucks, automobiles, and airplanes. Further, it should be apparent that various alterations, changes and modifications to the present system may be made without departing from the spirit and scope of the present invention as claimed in the appended claims.

We claim:

1. A navigation system for determining the location of a vehicle from the radio transmissions of two or more radio signal sources of known frequency and location in proximity of the vehicle comprising:
    means for entering and storing the frequencies and longitude and latitude positions of the at least two selected radio sources;
    a rotatable directionally sensitive antenna;
    means for rotating said directionally sensitive antenna through 360° in a step-wise fashion and providing signals representative of the angular position of said antenna in relation to the heading of the vehicle;
    means for detecting the heading of the vehicle and generating heading signals representative of said heading;
    means for detecting the stored frequencies of the at least two selected radio signal sources and causing said means for rotating to rotate said directionally sensitive antenna until said directionally sensitive antenna is positioned in a signal null position for each of said radio signal sources;
    means for comparing said angular position signals representative of the signal nulls with the heading signals to provide compass null headings for each of said radio signal sources;
    means for differentiating between real null headings and false null headings for each of said radio signal source;
    means for converting the point of intersection of said real null headings into corresponding longitude and latitude values for said vehicle;
    means for visually displaying said longitude and latitude values for the location of said vehicle.

2. A system as claimed in claim 1 wherein said means for detecting the stored frequencies comprises:
    means for generating reference frequencies representative of the frequencies of said stored prerecorded frequencies;
    means for detecting the amplitude of the signal received by said directionally sensitive antenna and corresponding to a selected one of said reference frequencies;
    means for converting the corresponding signal amplitude to a corresponding output digital signal representative of that amplitude.

3. A system as claimed in claim 1 wherein said means for rotating said antenna comprises:
    a stepping motor operably connected to said antenna for rotating said antenna through a series of predetermined angular increments;
    means for determining a starting reference point of said antenna;
    means for controlling the direction of said stepping motor;
    means for counting the number of increments through which said stepping motor rotates said antenna.

4. A system as claimed in claim 1 further comprising means for entering and recording the longitude and latitude of a desired destination of the vehicle;
    means for comparing the recorded longitude and latitude of the destination with the longitude and latitude of the determined location of the vehicle and determining the compass heading from the vehicle location to the destination and displaying that compass heading on said means for visually displaying.

5. A system as claimed in claim 1 wherein said means for detecting the heading of the vessel comprises:
   a compass;
   electronic means for detecting the angular readings of said compass and generating heading signals representative of said angular readings.

6. A system as claimed in claim 1 wherein said means for displaying comprises a digital readout device.

7. A system as claimed in claim 1 further comprising means for entering and recording the longitude and latitude position of a series of way points;
   means for successively comparing the recorded position of the way points and providing a visual display of the heading to be steered to each succeeding way point;
   audible signal means for sounding a signal when the vehicle arrives at each way point.

8. A system as claimed in claim 1 further comprising a clock means for providing precise time information;
   means for determining the speed of the vehicle and the estimated time of arrival of the vehicle to a preselected destination based upon the time information supplied by said clock.

9. A system as claimed in claim 1 further comprising auxiliary means for causing said visual display to display information relating to the condition of the vehicle.

10. A system as claimed in claim 1 further comprising a recorder for periodically recording the location information for the vehicle.

11. A system as claimed in claim 1 further comprising means of entering the coordinates of hazards and providing an audible signal when the vehicle is in the proximity of those hazards.

12. A system as claimed in claim 1 further comprising means for entering and storing a known true heading and comparing that true heading to the null heading of a known radio signal source and thereafter determining changes in true headings based upon changes in null headings to the known radio signal source.

13. A navigational system for determining the location of a vehicle comprising:
   a central processing means for manipulating data;
   a key input means for entering data into the system;
   a memory means for storing data entered by the key input means or manipulated by the central processing means;
   a rotatable directionally sensitive antenna;
   means for causing said antenna to rotate until a signal null is sensed for at least two preselected radio signal sources whose transmission frequency and location data had been previously entered by the key input means;
   means for providing to said central processor means data indicative of the relative angle between the heading of the vehicle and said directionally sensitive antenna at a radio signal null position for each radio signal source sensed by said antenna;
   said central processing means including means for manipulating vehicle heading data and said data indicative of the relative angle of the radio signal null to provide null heading data for each of said radio signal sources;
   said central processing means also including means for manipulating said location data of the radio signal source and the null heading data to determine the coordinates of the location of said vehicle and causing those coordinates to be displayed on the display means.

14. A system as claimed in claim 13 further comprising a clock for providing precise time data to the system.

15. A system as claimed in claim 14 wherein said processing means includes means for manipulating said time data, said location data and entered destination data and providing for visual display on said display means the estimated time of arrival and the speed of the vehicle.

16. A system as claimed in claim 13 wherein coordinates of a desired destination point may be entered by said input means and said processing unit includes means to determine the compass heading to be steered to arrive at the desired destination point.

17. A system as claimed in claim 16 wherein the coordinates of more than one desired destination point may be entered in sequence and the processing unit includes means for sequentially determining the heading to each succeeding destination point and causing an audible alarm to sound as the vehicle arrives at each destination point.

18. A system as claimed in claim 13 wherein said means for causing said antenna to rotate comprises:
   means for generating a reference signal representative of the transmission frequency of a preselected radio signal source;
   means for detecting the amplitude of the signal received by said directionally sensitive antenna corresponding to the reference signal and providing an output signal representative of the amplitude of the received signal corresponding to the frequency of the reference signal;
   means for causing said rotatable directionally sensitive antenna to rotate until a minimum signal amplitude is sensed.

19. A system as claimed in claim 13 further comprising means for recording the determined location coordinates periodically for future review.

20. A system as claimed in claim 13 further comprising means for monitoring operation of an engine of the vehicle and displaying operation data on the display means.

21. A system as claimed in claim 13 wherein said vehicle may be aligned in a known true heading and that true heading data entered and stored in said memory and said central processing means includes means to compare said true heading data with the corresponding null heading data to a known radio signal source and thereafter display on said display means the true heading of the vehicle as it changes by determining the changes of the null heading to the radio signal source.

22. A system as claimed in claim 21 wherein said central processing means also includes means to compare vehicle heading data provided by said compass means with said true heading data so that errors in said compass means resulting in variations in the earth's magnetic field can be compensated and corrected.

* * * * *

UNITED STATES PATENT AND TRADEMARK OFFICE
CERTIFICATE OF CORRECTION

PATENT NO. : 4,454,583

DATED : June 12, 1984

INVENTOR(S) : Schneiderhan, Edward M.; Pathe, Michael V.; & Schaffert, Kurt R.

It is certified that error appears in the above-identified patent and that said Letters Patent are hereby corrected as shown below:

In the Claims:

Column 10, line 10 - "selected radio sources;" should be -- selected radio signal sources;

Signed and Sealed this

First Day of October 1985

[SEAL]

Attest:

DONALD J. QUIGG

Attesting Officer

Commissioner of Patents and Trademarks—Designate